(12) United States Patent
Suzuki et al.

(10) Patent No.: US 8,964,672 B2
(45) Date of Patent: Feb. 24, 2015

(54) PAGING IN HETEROGENEOUS NETWORKS WITH DISCONTINUOUS RECEPTION

(75) Inventors: Takashi Suzuki, Ichikawa (JP); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/545,700

(22) Filed: Jul. 10, 2012

(65) Prior Publication Data

US 2013/0114484 A1    May 9, 2013

Related U.S. Application Data

(60) Provisional application No. 61/556,113, filed on Nov. 4, 2011.

(51) Int. Cl.
    *H04W 4/00*     (2009.01)
    *H04W 68/02*    (2009.01)
    *H04W 76/04*    (2009.01)
    *H04W 84/04*    (2009.01)

(52) U.S. Cl.
    CPC .......... *H04W 68/025* (2013.01); *H04W 76/048* (2013.01); *H04W 84/045* (2013.01)
    USPC ...................................................... 370/329

(58) Field of Classification Search
    CPC .................................................. H04W 68/02
    USPC .................... 455/458, 437; 370/311, 329
    See application file for complete search history.

(56) References Cited

U.S. PATENT DOCUMENTS

| | | | |
|---|---|---|---|
| 8,072,915 B1 | 12/2011 | Gutierrez et al. | |
| 8,743,723 B2 | 6/2014 | Watfa et al. | |
| 8,755,316 B2 * | 6/2014 | Aschan et al. | 370/311 |
| 2002/0041575 A1 | 4/2002 | Karabinis et al. | |
| 2003/0118123 A1 | 6/2003 | Hudson et al. | |
| 2003/0165120 A1 | 9/2003 | Uesugi et al. | |
| 2004/0240400 A1 | 12/2004 | Khan | |
| 2006/0194576 A1 | 8/2006 | Karabinis et al. | |
| 2008/0192703 A1 | 8/2008 | Suzuki | |
| 2008/0207170 A1 | 8/2008 | Khetawat et al. | |
| 2008/0207229 A1 | 8/2008 | Cave et al. | |
| 2008/0279194 A1 | 11/2008 | Tseng | |
| 2009/0092103 A1 | 4/2009 | Rao | |
| 2009/0103500 A1 | 4/2009 | Malkamaki et al. | |

(Continued)

FOREIGN PATENT DOCUMENTS

TW    201127147 A    8/2011

OTHER PUBLICATIONS

Suzuki, Takashi, et al.; U.S. Appl. No. 13/545,696, filed Jul. 10, 2012; Title: Accommodating Semi-Persistent Persistent Scheduling in Heterogeneous Networks with Restricted Subframe Patterns.

(Continued)

*Primary Examiner* — Omar Ghowrwal
*Assistant Examiner* — Gbemileke Onamuti
(74) *Attorney, Agent, or Firm* — Conley Rose, P.C.; J. Robert Brown, Jr.

(57) ABSTRACT

A method for operating a UE in a wireless communications network is provided. The method comprises attempting, by a UE configured to operate in a DRX mode and with time domain measurement resource restrictions, to read a paging message in a paging occasion in a restricted subframe during DRX active time.

19 Claims, 9 Drawing Sheets

(56) References Cited

U.S. PATENT DOCUMENTS

| | | | |
|---|---|---|---|
| 2009/0143072 A1 | 6/2009 | Montojo et al. | |
| 2009/0225708 A1 | 9/2009 | Harada et al. | |
| 2010/0034139 A1 | 2/2010 | Love et al. | |
| 2010/0074206 A1 | 3/2010 | Yu et al. | |
| 2010/0095183 A1 | 4/2010 | Petrovic et al. | |
| 2010/0167750 A1 | 7/2010 | Lee et al. | |
| 2010/0182939 A1 | 7/2010 | Ojala et al. | |
| 2010/0227606 A1 | 9/2010 | Nan et al. | |
| 2010/0240400 A1* | 9/2010 | Choi | 455/458 |
| 2010/0272004 A1 | 10/2010 | Maeda et al. | |
| 2010/0296427 A1 | 11/2010 | Lohr et al. | |
| 2010/0322174 A1 | 12/2010 | Ji et al. | |
| 2011/0038277 A1 | 2/2011 | Hu et al. | |
| 2011/0053625 A1 | 3/2011 | Ishii et al. | |
| 2011/0223924 A1 | 9/2011 | Lohr et al. | |
| 2011/0270984 A1 | 11/2011 | Park | |
| 2012/0044818 A1 | 2/2012 | Lindoff et al. | |
| 2012/0113843 A1 | 5/2012 | Watfa et al. | |
| 2012/0115485 A1* | 5/2012 | Narasimha et al. | 455/437 |
| 2012/0170541 A1 | 7/2012 | Love et al. | |
| 2012/0307922 A1 | 12/2012 | Simonsson et al. | |
| 2013/0039338 A1 | 2/2013 | Suzuki et al. | |
| 2013/0077507 A1 | 3/2013 | Yu et al. | |
| 2013/0128765 A1 | 5/2013 | Yang et al. | |

OTHER PUBLICATIONS

Suzuki, Takashi; U.S. Appl. No. 13/545,674, filed Jul. 10, 2012; Title: Paging in Heterogeneous Networks Using Restricted Subframe Patterns.

Suzuki, Takashi, et al.; U.S. Appl. No. 13/545,696, filed Jul. 10, 2012; Title: Accomodating Semi-Persistent Scheduling in Heterogeneous Networks with Restricted Subframe Patterns.

3GPP TS 36.300 V10.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2, Release 10; Jun. 2011; 194 pages.

3GPP TR 36.805 V1.2.0; 3rd Generation Partnership Project; Technical Specification Group Radio Access Network; Study on Minimization of Drive-Tests in Next Generation Networks; Release 9; Aug. 2009; 18 pages.

3GPP TS 36.331 V10.2.0; 3rd Generation Partnership Project; Technical Specification Group Radio Access Network; Evolved Universal Terrestrial Radio Access (E-UTRA); Radio Resource Control (RRC); Protocol Specification; Release 10; Jun. 2011; 294 pages.

3GPP TS 36.304 V10.2.0; 3rd Generation Partnership Project; Technical Specification Group Radio Access Network; Evolved Universal Terrestrial Radio Access (E-UTRA); User Equipment (UE) Procedures in Idle Mode; Release 10; Jun. 2011; 33 pages.

3GPP TS 36.321 V10.2.0; 3rd Generation Partnership Project; Technical Specification Group Radio Access Network; Evolved Universal Terrestrial Radio Access (E-UTRA); Medium Access Control (MAC) Protocol Specification; Release 10; Jun. 2011; 54 pages.

3GPP TS 37.320 V10.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Radio Measurement Collection for Minimization of Drive Tests (MDT); Overall Description; Stage 2, Release 10; Jun. 2011; 17 pages.

3GPP TS 36.211 V10.2.0; 3rd Generation Partnership Project; Technical Specification Group Radio Access Network; Evolved Universal Terrestrial Radio Access (E-UTRA); Physical Channels and Modulation; Release 10; Jun. 2011; 103 pages.

3GPP TS 36.321 V10.5.0; 3rd Generation Partnership Project; Technical Specification Group Radio Access Network; Evolved Universal Terrestrial Radio Access (E-UTRA); Medium Access Control (MAC) Protocol Specification; Release 10; Mar. 2012; 54 pages.

3GPP TS 36.304 V10.6.0; 3rd Generation Partnership Project; Technical Specification Group Radio Access Network; Evolved Universal Terrestrial Radio Access (E-UTRA); User Equipment (UE) Procedures in Idle Mode; Release 10; Jun. 2012; 33 pages.

3GPP TS 36.331 V10.6.0; 3rd Generation Partnership Project; Technical Specification Group Radio Access Network; Evolved Universal Terrestrial Radio Access (E-UTRA); Radio Resource Control (RRC); Protocol Specification; Release 10; Jun. 2012; 302 pages.

3GPP TS 36.300 V10.8.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2, Release 10; Jun. 2012; 194 pages.

3GPP TS 36.213 V10.6.0; 3rd Generation Partnership Project; Technical Specification Group Radio Access Network; Evolved Universal Terrestrial Radio Access (E-UTRA); Physical Layer Procedures; Release 10; Jun. 2012; 125 pages.

3GPP TSG-RAN WG2 Meeting #75bis; "Connected Mode Paging Enhancement"; R2-115347; Zhuhai, China; Oct. 10-14, 2011; 2 pages.

3GPP TSG-RAN WG2 Meeting #75; "Measurement Restriction for Inter-Frequency eICIC"; R2-113790; Athens, Greece; Aug. 22-26, 2011; 3 pages.

3GPP TSG-RAN WG2 Meeting #75; "Measurement Resource Restrictions for UE Rx-Tx Time Difference"; R2-114292; Athens, Greece; Aug. 22-26, 2011; 2 pages.

3GPP TSG-RAN WG2 Meeting #75; "Use Cases and Main Issues for Idle Mode eICIC"; R2-114436; Athens, Greece; Aug. 22-26, 2011; 3 pages.

3GPP TSG-RAN WG2 Meeting #75; "Correcting the Ambiguity of Modification-Period Boundaries"; R2-114447; Athens, Greece; Aug. 22-26, 2011; 7 pages.

PCT Search Report; Application No. PCT/US2012/035864; Nov. 28, 2012; 3 pages.

PCT Written Opinion of the International Searching Authority; Application No. PCT/US2012/035864; Nov. 28, 2012; 4 pages.

PCT Search Report; Application No. PCT/US2012/62806; Jan. 18, 2013; 2 pages.

PCT Written Opinion of the International Searching Authority; Application No. PCT/US2012/62806; Jan. 18, 2013; 6 pages.

PCT Search Report; Application No. PCT/US2012/62807; Jan. 18, 2013; 2 pages.

PCT Written Opinion of the International Searching Authority; Application No. PCT/US2012/62807; Jan. 18, 2013; 5 pages.

PCT Search Report; Application No. PCT/US2012/62808; Jan. 18, 2013; 2 pages.

PCT Written Opinion of the International Searching Authority; Application No. PCT/US2012/62808; Jan. 18, 2013; 7 pages.

Office Action dated Sep. 18, 2013; U.S. Appl. No. 13/250,486, filed Sep. 30, 2011; 26 pages.

Office Action dated Apr. 25, 2014; U.S. Appl. No. 13/250,486, filed Sep. 30, 2011; 13 pages.

Office Action dated Mar. 21, 2014; U.S. Appl. No. 13/545,674, filed Jul. 10, 2012; 27 pages.

Office Action dated Mar. 27, 2014; U.S. Appl. No. 13/545,696, filed Jul. 10, 2012; 54 pages.

Notice of Allowance dated Aug. 19, 2014; U.S. Appl. No. 13/250,486, filed Sep. 30, 2011; 15 pages.

Notice of Allowance dated Jul. 30, 2014; U.S. Appl. No. 13/545,674, filed Jul. 10, 2012; 18 pages.

Taiwan Office Action; Application No. 101140883; Jun. 10, 2014; 12 pages.

Final Office Action dated Sep. 16, 2014; U.S. Appl. No. 13/545,696, filed Jul. 10, 2012; 37 pages.

Taiwan Office Action; Application No. 101140890; Jul. 17, 2014; 14 pages.

Taiwan Office Action; Application No. 101140891; Sep. 5, 2014; 11 pages.

(56) References Cited

OTHER PUBLICATIONS

Suzuki, Takashi; U.S. Appl. No. 14/537,278, filed Nov. 10, 2014; Title: Paging in Heterogeneous Networks Using Restricted Subframe Patterns; 65 pages.

Office Action dated Dec. 3, 2014, U.S. Appl. No. 13/250,486, filed Sep. 30, 2011; 8 pages.

Notice of Allowance dated Nov. 25, 2014; U.S. Appl. No. 13/545,696, filed Jul. 10, 2012; 20 pages.

* cited by examiner

| On Duration start in SF | position of restricted SF (On duration) | PO nearest to on duration | position of restricted SF (First PO) | PO 2nd nearest to on duration | position of restricted SF (Second PO) |
|---|---|---|---|---|---|
| 1 | 1 | 9 | 1 | 19 | 3 |
| 257 | 1 | 259 | 3 | 269 | 5 |
| 513 | 1 | 519 | 7 | 529 | 1 |
| 769 | 1 | 769 | 1 | 779 | 3 |
| 1025 | 1 | 1029 | 5 | 1039 | 7 |
| 1281 | 1 | 1289 | 1 | 1299 | 3 |
| 1537 | 1 | 1539 | 3 | 1549 | 5 |
| 1793 | 1 | 1799 | 7 | 1809 | 1 |
| 2049 | 1 | 2049 | 1 | 2059 | 3 |
| 2305 | 1 | 2309 | 5 | 2319 | 7 |
| 2561 | 1 | 2569 | 1 | 2579 | 3 |
| 2817 | 1 | 2819 | 3 | 2829 | 5 |
| 3073 | 1 | 3079 | 7 | 3089 | 1 |
| 3329 | 1 | 3329 | 1 | 3339 | 3 |
| 3585 | 1 | 3589 | 5 | 3599 | 7 |
| 3841 | 1 | 3849 | 1 | 3859 | 3 |
| 4097 | 1 | 4099 | 3 | 4109 | 5 |
| 4353 | 1 | 4359 | 7 | 4369 | 1 |
| 4609 | 1 | 4609 | 1 | 4619 | 3 |
| 4865 | 1 | 4869 | 5 | 4879 | 7 |

Figure 6

| OnD in SF | Closest PO in SF | RSFP of OnD | RSFP on PO |
|---|---|---|---|
| 19 | 19 | 3 | 3 |
| 1043 | 1049 | 3 | 1 |
| 2067 | 2069 | 3 | 5 |
| 3091 | 3099 | 3 | 3 |
| 4115 | 4119 | 3 | 7 |
| 5139 | 5139 | 3 | 3 |
| 6163 | 6169 | 3 | 1 |
| 7187 | 7189 | 3 | 5 |
| 8211 | 8219 | 3 | 3 |
| 9235 | 9239 | 3 | 7 |
| 10259 | 10259 | 3 | 3 |
| 11283 | 11289 | 3 | 1 |
| 12307 | 12309 | 3 | 5 |
| 13331 | 13339 | 3 | 3 |
| 14355 | 14359 | 3 | 7 |
| 15379 | 15379 | 3 | 3 |
| ... | ... | ... | ... |

Figure 7

PAGING IN HETEROGENEOUS NETWORKS WITH DISCONTINUOUS RECEPTION

CROSS-REFERENCE TO RELATED APPLICATIONS

The present application claims priority to U.S. Provisional Patent Application No. 61/556,113, filed Nov. 4, 2011 by Takashi Suzuki, et al., entitled "Paging in Heterogeneous Networks with Discontinuous Reception" which is incorporated by reference herein as if reproduced in its entirety.

BACKGROUND

As telecommunications technology has evolved, more advanced network access equipment has been introduced that can provide services that were not possible previously. This network access equipment might include systems and devices that are improvements of the equivalent equipment in a traditional wireless telecommunications system. Such advanced network access equipment may be included in evolving wireless communications standards, such as long-term evolution (LTE). For example, in an LTE system the advanced network access equipment might include an Evolved Universal Terrestrial Radio Access Network (E-UTRAN) node B (eNB). In various wireless communications systems, the advanced network access equipment may include a base station a wireless access point, or a similar component operable as an access node according to a corresponding wireless communications standard. Any such component will be referred to herein as an eNB, but it should be understood that such a component is not necessarily an eNB. Such a component may also be referred to herein as an access node or base station.

LTE may be said to correspond to Third Generation Partnership Project (3GPP) Release 8 (Rel-8 or R8), Release 9 (Rel-9 or R9), and Release 10 (Rel-10 or R10), and possibly also to releases beyond Release 10, while LTE Advanced (LTE-A) may be said to correspond to Release 10 and possibly also to releases beyond Release 10. While the present disclosure is described in relation to an LTE-A system, the concepts are equally applicable to other wireless communications systems as well.

As used herein, the term "user equipment" (alternatively "UE") refers to equipment that communicates with an access node to obtain services via the wireless communications system. A UE might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

BRIEF DESCRIPTION OF THE DRAWINGS

For a more complete understanding of this disclosure, reference is now made to the following brief description, taken in connection with the accompanying drawings and detailed description, wherein like reference numerals represent substantially similar parts.

FIG. 6 is a table showing on-duration periods and paging occasions, according to an embodiment of the disclosure.

FIG. 7 is a table showing paging occasions and DRX on-durations that fit into restricted subframes, according to an embodiment of the disclosure.

DETAILED DESCRIPTION

Figure 1:
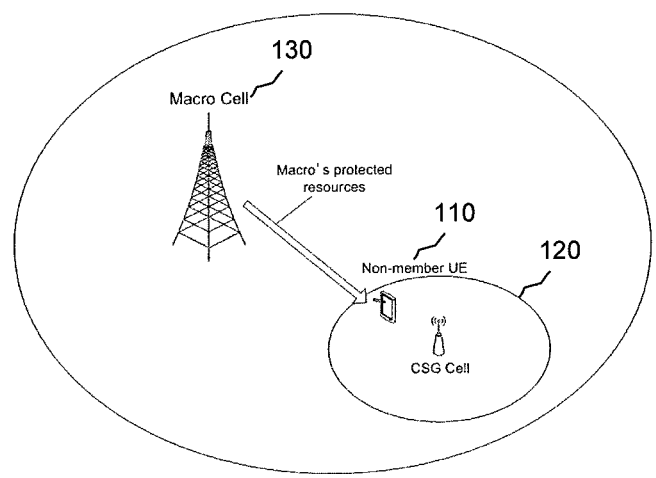
FIG. 1 is a diagram of a closed subscriber group HetNet deployment.

In wireless telecommunications systems, transmission equipment in an access node transmits signals throughout a geographical region referred to as a cell. One type of access node, such as an eNB, may be associated with a macro cell. Another type of access node, such as a low power node (e.g., femto cells, relays, or pico cells), may be associated with a low power cell. A heterogeneous network (HetNet) is a network that can include macro cells and low-power cells. For example, a HetNet may include a system of macro cells that operate at high power levels, and a system of low power cells, such as pico cells and relay nodes, which operate at reduced power levels. The low power cells can be overlaid on top of the macro cells, possibly sharing the same frequency. The low power cells may be used to offload the macro cells, improve coverage, and/or increase network performance. 3GPP has studied HetNet deployments as a performance enhancement enabler in LTE-Advanced (Release 10). In HetNet deployments, inter-cell interference coordination (ICIC) can prevent interference between the signals transmitted by the macro cell and the low-power nodes. Time domain-based resource sharing or coordination has been adopted as enhanced ICIC (eICIC). As described in 3GPP Technical Specification (TS) 36.300, the deployment scenarios where eICIC is utilized may include a closed subscriber group (CSG) (also referred to as femto cell) scenario and a pico cell scenario.

In the CSG scenario, a dominant interference condition may occur when non-member users are in close proximity to a CSG cell. Typically, the Physical Downlink Control Channel (PDCCH) might be severely interfered with by downlink transmissions from a non-member CSG cell. Interference to the PDCCH of the macro cell can have a detrimental impact on both uplink and downlink data transfer between the UE and the macro cell. In addition, other downlink control channels and reference signals, from both the macro cell and the neighbor cells, that may be used for cell measurements and radio link monitoring can also be interfered with by a downlink transmission from a non-member CSG cell. Depending on network deployment and strategy, it may not be possible to divert the users suffering from inter-cell interference to another E-UTRA (Evolved UMTS (Universal Mobile Telecommunications System) Terrestrial Radio Access) carrier or another radio access technology (RAT). Time domain ICIC may be used to allow such non-member UEs to remain served by the macro cell on the same frequency layer. Such interference may be mitigated by the CSG cell utilizing Almost Blank Subframes (ABSs) to protect the corresponding macro cell's subframes from the interference. ABSs are subframes with reduced transmit power and/or reduced activity (possibly including no transmission) on some physical channels. A non-member UE may be signaled to utilize the protected resources for radio resource management (RRM) measurements, radio link monitoring (RLM) and channel state information (CSI) measurements for the serving macro cell, allowing the UE to continue to be served by the macro cell under strong interference from the CSG cell.

An example of the CSG scenario is shown in FIG. 1. Since a UE 110 that is not a member of a CSG is within the coverage area of the CSG cell 120, signals from the CSG cell 120 could interfere with signals sent to the UE 110 from a macro cell 130.

In the pico scenario, time domain ICIC may be utilized for pico users that are served in the edge of the serving pico cell, e.g., for traffic off-loading from a macro cell to a pico cell. Typically, the PDCCH might be severely interfered with by downlink transmission from the macro cell. In addition, other downlink control channels and reference signals, from both the pico cell and neighbor pico cells, that may be used for cell measurements and radio link monitoring can also be interfered with by a downlink transmission from the macro cell. Time domain ICIC may be utilized to allow such UEs to remain served by the pico cell on the same frequency layer. Such interference may be mitigated by the macro cell utilizing ABSs to protect the corresponding pico cell's subframes from the interference. A UE served by a pico cell can use the protected resources for RRM, RLM, and CSI measurements for the serving pico cell.

Figure 2:
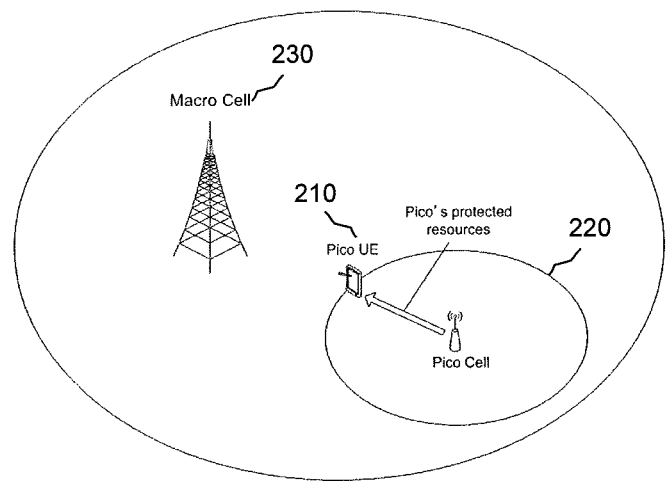
FIG. 2 is a diagram of a pico HetNet deployment.

An example of the pico scenario is shown in FIG. 2. A UE 210 that is at the edge of the coverage area of a pico cell 220 might be close enough to a macro cell 230 that signals from the macro cell 230 could interfere with signals sent to the UE 110 from the pico cell 220.

For time domain ICIC, subframe utilization across different cells can be coordinated in time through backhaul signaling or configuration of patterns in the ABS. The ABSs in an aggressor cell can be used to protect resources in subframes in a victim cell receiving strong inter-cell interference. The ABS pattern is used to identify subframes (referred to as "restricted" subframes or "protected" subframes) during which the aggressor cell transmits an almost blank subframe. The restricted subframes provide an opportunity to measure transmissions from the victim cell more accurately because there should be less or no interference from the aggressor cell.

The serving eNB can ensure backwards compatibility toward UEs by transmitting necessary control channels and physical signals as well as system information during the restricted subframes. Patterns based on ABSs can be signaled to the UE to cause the UE to restrict measurements to specific subframes. These restrictions may be time domain measurement resource restrictions. There are different patterns depending on the type of measured cell (serving or neighbor cell) and measurement type (e.g., RRM or RLM).

Figure 3:
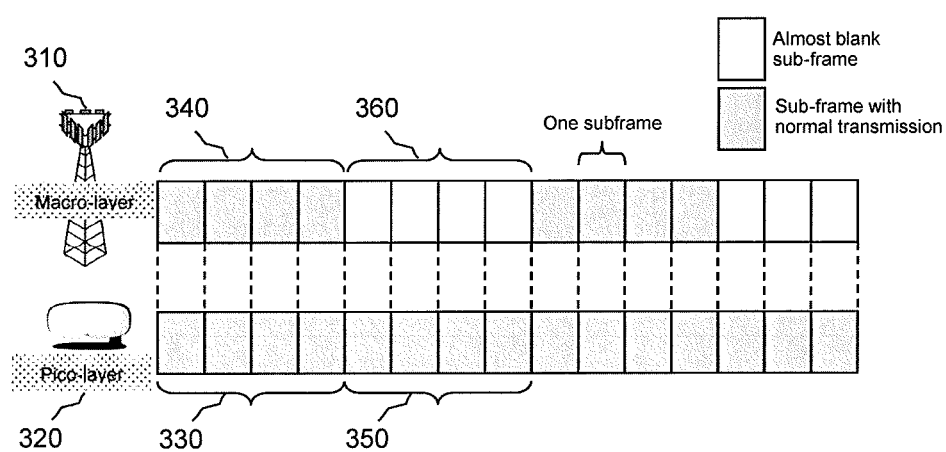
FIG. 3 is a diagram of examples of almost blank subframes.

An example of an ABS pattern for the pico scenario is shown in FIG. 3. In this example, a macro eNB 310 (the aggressor) configures and transfers the ABS patterns to a pico eNB 320 (the victim). To protect the UEs served by the pico eNB 320 in the edge of the pico cell, the macro eNB 310 does not schedule data transmissions in ABS subframes. The pico eNB 320 may rely upon the ABS pattern to schedule transmissions to various UEs in the restricted subframes. For example, the pico eNB 320 may schedule transmissions to and from a first UE regardless of the ABS patterns, such as when the first UE is in the cell center. Alternatively, the pico eNB 320 may schedule transmissions to and from a second UE only in the restricted subframes indicated by the ABS pattern, such as when the second UE is near the cell edge.

In other words, the pico layer subframes 330 that occur at substantially the same time as the macro layer subframes 340 may be said to be aligned with those macro layer subframes 340. In subframes 340 where the macro eNB 310 is active, the pico eNB 320, in subframes 330, schedules only those UEs without excessive range extension. During pico layer subframes 350 that are aligned with almost blank macro eNB subframes 360, the pico eNB 320 can also schedule UEs that have large range extension offsets and that would otherwise not be schedulable due to too much interference from the macro layer 310.

The pico cell eNB may configure a UE at the edge of the cell with three different measurement resource restrictions independently based on an ABS pattern received from the macro cell eNB. The first restriction is for RRM measurement and RLM for the Primary cell, that is, PCell (in this case the serving pico cell). If configured, the UE measures and performs RLM of the PCell only in the restricted subframes. The second restriction is for RRM measurement of neighbor cells on the primary frequency. If configured, the UE measures neighbor cells in the restricted subframes only. The restriction also contains target neighbor cells optionally. The third restriction is for channel state estimation of the PCell. If configured, the UE estimates CSI and CQI/PMI/RI in the restricted subframes only.

The subframe pattern for the measurement restrictions in the RRC protocol in version 10.3.0 of 3GPP TS 36.331 is defined as shown in Text Box 1 at the end of the Detailed Description section of this document. In frequency division duplexing (FDD), the pattern is repetition of 40 subframes and in TDD the pattern is repetition of 20, 60 and 70 subframes depending on the configuration.

Sections 5.2.1.3 to 5.2.1.5 of version 10.3.0 of the RRC specification (3GPP TS 36.331) explain how paging is used to notify the UE of a change in system information and/or the arrival of Earthquake and Tsunami Warning System (ETWS) messages or Commercial Mobile Alert Service (CMAS) messages. These sections of 3GPP TS 36.331 are reproduced as Text Box 2 at the end of the Detailed Description section of this document. When a change in system information occurs, the UE attempts to read at least modificationPeriodCoeff times during the modification period, and for ETWS and CMAS notification the UE attempts to read at least once every defaultPagingCycle.

The paging frame and paging occasion are defined in sections 7.1 and 7.2 of version 10.3.0 of 3GPP TS 36.304. These sections are reproduced as Text Box 3 at the end of the Detailed Description section of this document. The paging frame and paging occasion depend on the International Mobile Subscriber Identity (IMSI) of the UE. In idle mode, the UE monitors a specific paging occasion in a paging frame. If there is a paging message for the UE, the paging occasion will include a resource block assignment where the UE should receive the paging message. In idle mode, the UE should check at least one paging occasion per default paging cycle (or per discontinuous reception (DRX) cycle).

Figure 5A:
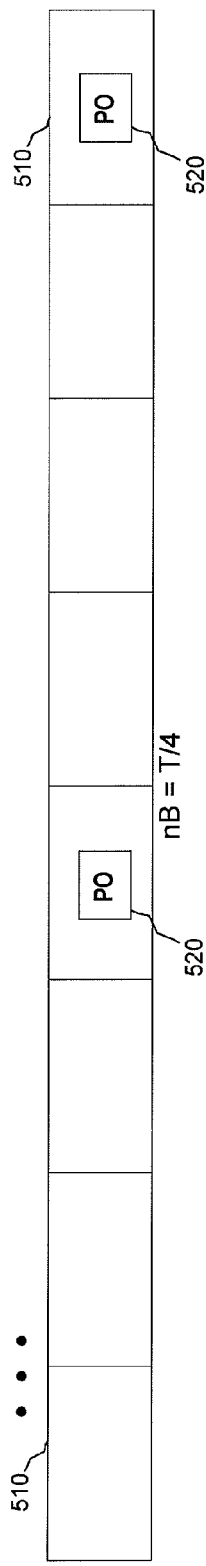
FIGS. 5a, 5b, and 5c are diagrams of paging occasions, the nB parameter, and a restricted subframe, according to an embodiment of the disclosure.
Figure 5B:
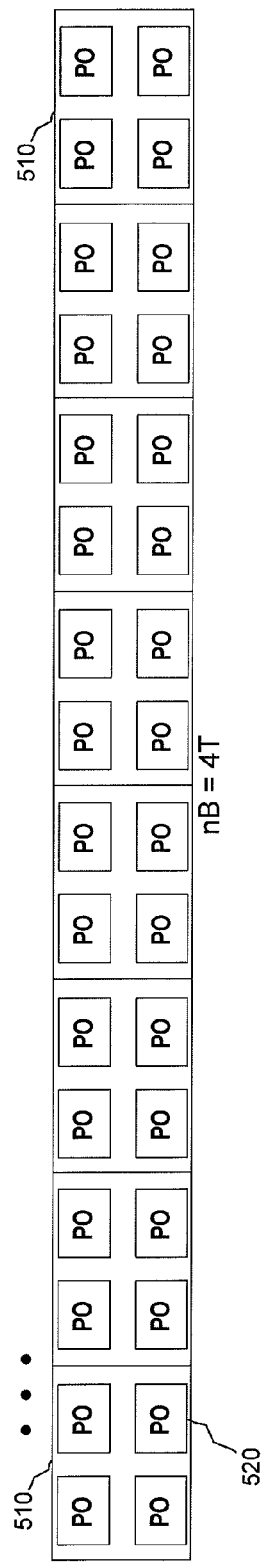
Figure 5C:
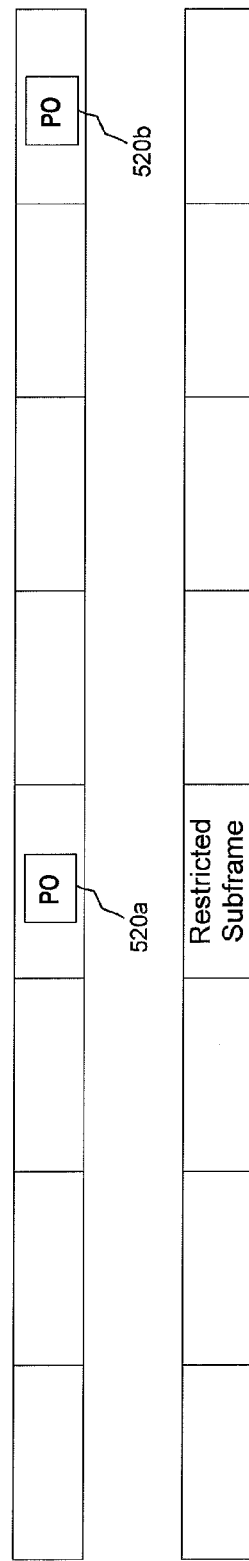

In connected mode, the UE may also receive paging messages for a system information change or for ETWS/CMAS notification. Since those notifications are common for all UEs, a UE may read paging messages in any available paging occasions. It should be noted that the density of the paging frames is dependent upon the parameter nB. The busier a network is, the more paging needs to occur, and the higher the value of nB will be. For example, as shown in FIG. 5a, if nB is set to T/4, every fourth radio frame 510 contains a paging occasion 520. As shown in FIG. 5b, if nB is set to 4T, every radio frame 510 contains four paging occasions 520. FIG. 5c depicts a paging occasion 520a that is aligned with a restricted subframe 530 and a paging occasion 520b that is not aligned with a restricted subframe.

Parameters related to paging are signaled by the RRC protocol as specified in version 10.3.0 of 3GPP TS 36.331 and as shown in Text Box 4 at the end of the Detailed Description section of this document. PCCH Config contains the default paging cycle and nB. BCCH Config contains the modification period coefficient.

DRX operation in connected mode is defined in section 5.7 of version 10.3.0 of the Medium Access Control (MAC) specification, 3GPP TS 36.321. That section is reproduced as Text Box 5 at the end of the Detailed Description section of this document. The UE monitors the PDCCH in active time including the on-duration period. The start of the on-duration period is determined by a DRX start offset and a DRX cycle length. The objective of the DRX start offset is to evenly distribute traffic to be handled over each subframe. It should be noted that the UE might need to monitor the PDCCH according to other requirements, such as the paging channel reception described in section 5.5 of 3GPP TS 36.321.

This disclosure is related to the alignment between paging occasions and DRX configuration. In connected mode, a UE is allowed to read paging in any paging occasions. The UE may take advantage of an on-duration period to monitor paging occasions in order to not affect the DRX and battery consumption of the UE. On the other hand, the UE is required to read paging at least once every defaultPagingCycle to check whether ETWS or CMAS notification is present or not. Therefore, the UE may have to wake up from DRX to meet this requirement.

In order to ensure reliable paging detection in a HetNet environment, the UE may need to find a paging occasion that is in a restricted subframe. There may be a sufficient number of such occasions to satisfy the ETWS and CMAS monitoring requirement if the UE is allowed to wake up from the DRX to read paging. From UE battery life perspectives, waking up from DRX should be avoided as much as possible. The embodiments disclosed herein provide for first checking if it is possible to limit access to the paging channel only during on-duration periods that are protected by restricted subframes while meeting the ETWS and CMAS monitoring requirement.

FIG. 6 shows the starting subframe of on-duration periods, the nearest and second nearest paging occasions from the on-duration periods, and the corresponding ⅛ subframe pattern which covers each of the first subframe of the on-duration periods and the two paging occasions. In FIG. 6, long DRX cycle, DRX Start offset, on-duration period and nB in PCCH configuration are set to 256 ($2^8$) ms, 1 subframe, 4 subframes, and same as the default paging cycle, respectively. A ⅛ subframe pattern is distinguished by the position of a restricted subframe which is an integer 0 to 7.

The paging occasions which are both in an on-duration period and are protected by the restricted subframes of the pattern 1 are highlighted with darker shading. The interval between the adjacent darkly shaded subframes is 1280 ms. If the default paging cycle is set to 640 ms, reading just the darker shaded frames does not meet the ETWS and CMAS monitoring requirement. If the default paging cycle is set to 1280 ms, the requirement is met. However, if the UE fails to decode once, then the UE may need to wake up from the DRX and read another paging occasion. It can thus be observed that, with a certain combination of PCCH configuration, DRX configuration, and subframe pattern, the ETWS and CMAS monitoring requirement is not met if the UE is limited to reading paging occasions only in on-duration periods that are in restricted subframes.

If the ETWS and CMAS monitoring requirement is not satisfied, the UE may need to wake up and read more paging occasions that are protected by the subframe pattern. From the perspective of UE battery saving, the frequency of such wake-ups should be kept to a minimum.

Subframes highlighted with lighter shading in FIG. 6 are paging occasions protected by the same subframe pattern 1 and near the on-duration period. For example, the subframe 1289 is just five subframes after the end of the on-duration period (subframe 1281-1284). If any new data arrives during the on-duration period, the subframe 1289 will be in active time due to the inactivity timer, and the UE can read the paging occasion during the active time. The subframe 1809 is 16 subframes after the subframe 1793. If there is a downlink assignment in subframe 1793 and the decoding of the assignment fails two times, the subframe 1809 will be in active time waiting for retransmission.

The intervals between the subframes 769 and 1289, 1289 and 1809, 1809 and 2049 are 520, 520 and 240 ms, respectively. All of the intervals are less than the default paging cycle (640 ms). Therefore if the UE attempts to read paging in active time, the frequency of wake-ups will be reduced. In an embodiment, a UE attempts to read paging occasions in restricted subframes during active time.

In the above UE-based embodiment, the UE may need to estimate how many paging occasions would be in restricted subframes and in active time during the next default paging cycles. The UE could maintain and use the average length of the active time for the estimation. However, the estimation may not be perfect since the active time depends on data arrival in the future.

In an alternative embodiment, a specific configuration of DRX parameters may be implemented to alleviate the problem. For example, by setting the long DRX cycle length to 320 ($5*2^6$) ms and the DRX start offset to 9, every on-duration period coincides with a paging occasion that is protected by a restricted subframe, as shown in Table 1 below. In this case, the interval between the two paging occasions to read is 320 ms, which meets the ETWS and CMAS monitoring requirement (with a default paging cycle of 640 ms). With a specific setting of DRX configuration (long DRX cycle length set to $5*2^n$ and DRX start offset to align on-duration periods to paging occasions that are protected by restricted subframes), the UE may be able to avoid extra wake-up from the DRX and implement estimation of active time duration. Therefore, in an embodiment, the network may configure the long DRX cycle to $5*2^n$ and the DRX start offset to align on-duration periods to paging occasions that are protected by restricted subframes in a PCell.

TABLE 1

| On Duration and PO | position of restricted SF |
|---|---|
| 9 | 1 |
| 329 | 1 |

TABLE 1-continued

| On Duration and PO | position of restricted SF |
|---|---|
| 649 | 1 |
| 969 | 1 |
| 1289 | 1 |
| 1609 | 1 |

Long DRX cycle length can be configured to 10, 20, 32, 40, 64, 80, 128, 160, 256, 320, 512, 640, 1024, 1280, 2048, 2560 subframes according to the RRC specification (3GPP TS 36.331 version 10.3.0). FIG. 7 shows the start of on-duration periods (OnD) in subframes and the paging occasions closest to the on-duration period (Closest PO) in subframes when the long DRX cycle length is 1024 subframes and its start offset is 19 subframes. Assuming that the subframe pattern is RSFP 3 ("0001000000010000 . . . "), all the first subframes of on-duration periods fit into the restricted subframes, but not all the paging occasions fit into the restricted subframes. The interval between the paging occasions that fit into on-duration periods and the restricted subframes is 5120 subframes (512 radio frames), as highlighted with darker shading. Paging occasions that fit into the restricted subframes and are closest to the on-duration period (assuming the on-duration is four subframes) are highlighted with lighter shading. Since the active time may be extended over the on-duration period by retransmission or a new data arrival and the inactivity timer, there is a good chance that paging occasions highlighted with lighter shading may be in the active time because only five subframes are extended after the end of on-duration period. The shortest interval between the darkly and lightly shaded subframes is only 2040 subframes.

If the UE is limited to read paging during the on-duration period that fits into restricted subframes only, the interval between the paging occasions may be too long. As described above, for detection of ETWS and CMAS notification, the UE needs to read paging at least once per default paging cycle, which could be configured to be 256 radio frames. If the UE attempts to read paging in an active time that fits into the restricted subframes, the above requirement can be satisfied.

In summary, UE behavior is currently not clear with regard to paging reception in connected mode in HetNet environments. If the UE is limited to read paging in on-duration periods which fit into the restricted subframes only, the UE may not be able to read paging as often as required for system information changes or ETWS/CMAS notifications. The implementations described herein address this problem.

When DRX is not configured, the UE reads paging in paging occasions which fit into protected subframes. There could be many paging occasions that satisfy the condition above to meet the requirements for system information changes and ETWS/CMAS notifications. For example, when DRX is configured, in a first behavior, the UE may read paging when the paging occasion fits into protected subframes. Alternatively, in a second behavior, the UE may read paging when the paging occasion is within the active time. Alternatively, in a third behavior, the UE may read paging when the paging occasion is within the active time and fits into protected subframes. Alternatively, in a fourth behavior, the UE may read paging when the paging occasion is within an on-duration or when the inactivity timer is running and the paging occasion fits into protected subframes. Alternatively, in a fifth behavior, the UE may read paging when the paging occasion is within an on-duration and the paging occasion fits into protected subframes.

With the first behavior, the UE may have sufficient opportunities to read paging, but the UE may need to wake up from the DRX when the DRX is not aligned. As for the second behavior, the UE may have sufficient opportunities to read paging, but some of the paging occasions are not restricted subframes. Therefore, the UE's battery power may be wasted when the UE encounters many decoding failures. With regard to the fifth behavior, the battery usage could be improved. However, as indicated above, the paging occasions to read in the fifth behavior may be fewer than the ETWS/CMAS monitoring requirement.

The third and fourth behaviors described above may be used in order to satisfy the paging requirements and provide efficient battery usage. That is, the UE might read paging when the paging occasion is within protected subframes and in active time. It should be understood that other combinations of the behaviors described may be feasible in accordance with various embodiments of this disclosure.

For the third and fourth behaviors, the UE may estimate available paging occasions which satisfy the requirements described above during the modification period or default paging cycle based on the BCCH and PCCH configurations and the configured DRX and subframe patterns. In order to calculate the number of paging occasions to read, the UE may assume that the probability of a target paging occasion being within the active time is a predetermined number, for example 50%. Alternatively, the UE may assume that the probability of a target paging occasion being within the active time is proportional to current data activity (for example, the average number of new transmissions (i.e., triggering the inactivity timer) per on-duration time). For example, if the average ratio of new transmission arrivals in an on-duration (4 subframes) is 25% and the inactivity timer is 20 subframes, the calculated active time is $4*(1-0.25)+(20+4/2)*0.25=9$. Applying this number to the table in FIG. 11, the paging occasions highlighted with lighter shading can be read while the UE is in active mode. Alternatively, the UE may calculate the average length of the active time in subframes and use the average to estimate the number of paging occasions to read.

As described above, the number of paging occasions to read should typically be higher than or equal to one occasion within the default paging cycle for ETWS/CMAS notification and higher than modificationperiodcoeff times within the modification period for a system information change notification. Based on the estimation of how many paging occasions to read, the UE may choose which behavior to use in reading paging. In terms of battery usage, the fifth behavior may be preferred because the UE does not need to wake up just to read paging. However, depending on the PCCH, DRX and subframe pattern configuration, the estimated number may be less than the requirement. In such a case, the UE may choose to use the third or fourth behavior. If the estimated number is still not sufficient, the UE may be configured to operate according to the first or second behavior.

Alternatively, with a careful choice of DRX configuration parameters, paging occasions can coincide with on-duration periods and restricted subframes. For example, in FDD, assuming nB is set to T, if the long DRX cycle in connected mode DRX configuration is set to $5*2^n$ (n=3, 4, . . . 9), and the DRX start offset is set to $10*m+9$ (m=0, 1, . . . floor($(5*2^n-9)/10$)), some paging occasions are in an on-duration and in a restricted subframe. Table 2 below shows an example when n is 7 and m is 10. As seen in the table, every on-duration period coincides with a paging occasion and a restricted subframe. As long as the DRX long cycle is shorter than or equal to the default paging cycle, the UE does not have to wake up from the DRX. In order to be applicable to more general cases for FDD, the condition above can be extended as follows. Long DRX cycle in connected mode DRX configuration is set to $5*2^n$ (n=3, 4, . . . 9). DRX start offset is set to $10*\max(1, T/nB)*m+s-d$, where T and nB are defined in section 7 of 3GPP TS 36.304, m is an integer ($0<=m<\text{ceiling}((5*2^n-s)/(10*\max(1, T/nB)))$, d is an integer ($0<=d<$on duration period in subframe) and s is the subframe number of a paging occasion in one radio frame. For example, if nB<=T, s is 9, if nB=2T s is 4 or 9 and if nB=4T s is 0, 4, 5, or 9. Concerning time division duplexing (TDD), a typical subframe pattern is 1/10. The condition is Long DRX cycle in connected mode DRX configuration is set to $5*2^n$ (n=1, 2, . . . 9). DRX start offset is set to $10*\max(1, T/nB)*m+s-d$, where T and nB are defined in section 7 of 3GPP TS 36.304, m is an integer ($0<=m<\text{ceiling}((5*2^n-s)/(10*\max(1, T/nB)))$), d is 0 or 1 and s is the subframe number of a paging occasion in one radio frame. For example, if nB<=T, s is 0, if nB=2T s is 0 or 5 and if nB=4T s is 0, 1, 5, or 6.

TABLE 2

| On Duration start in SF | RSFP of On duration start | PO nearest to on duration | RSFP of the PO |
|---|---|---|---|
| 109 | 5 | 109 | 5 |
| 749 | 5 | 749 | 5 |
| 1389 | 5 | 1389 | 5 |
| 2029 | 5 | 2029 | 5 |
| 2669 | 5 | 2669 | 5 |
| 3309 | 5 | 3309 | 5 |

The concepts described above can be implemented by changes to the current MAC specification (3GPP TS 36.321) as shown in an embodiment of the disclosure below.
5.5 PCH Reception
When the UE needs to receive PCH, the UE shall:
    if a PCH assignment has been received on the PDCCH of the PCell for the P-RNTI:
        attempt to decode the TB on the PCH as indicated by the PDCCH information.
        if a TB on the PCH has been successfully decoded:
        deliver the decoded MAC PDU to upper layers.
NOTE: The UE should attempt to read paging in active time and restricted subframes when measSubframePatternPCell is configured.

Figure 8:
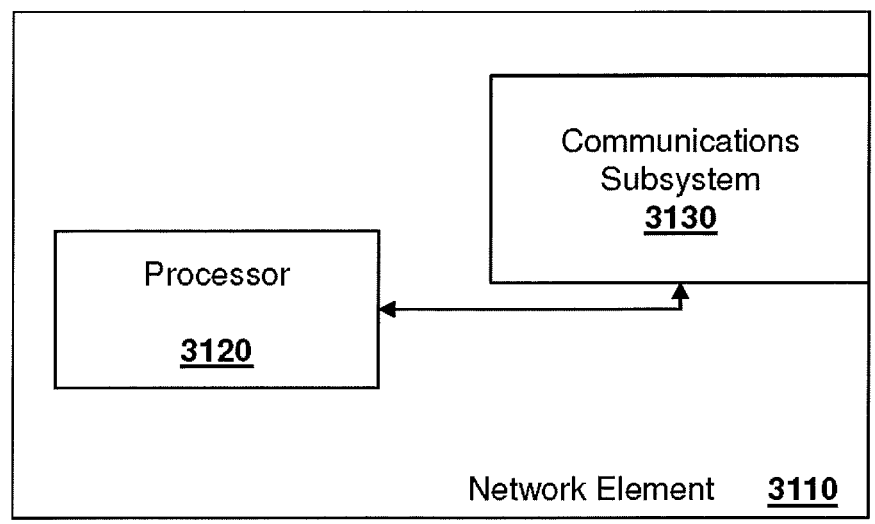
FIG. 8 is a simplified block diagram of an exemplary network element according to one embodiment.

Alternatively, additional description with regard to DRX configuration can be added to the ASN.1 definition as shown in an embodiment of the disclosure below.

with regard to FIG. 8. In FIG. 8, network element 3110 includes a processor 3120 and a communications subsystem 3130, where the processor 3120 and communications subsystem 3130 cooperate to perform the methods described above.

Further, the above may be implemented by a UE. One exemplary device is described below with regard to FIG. 9. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

Figure 9:
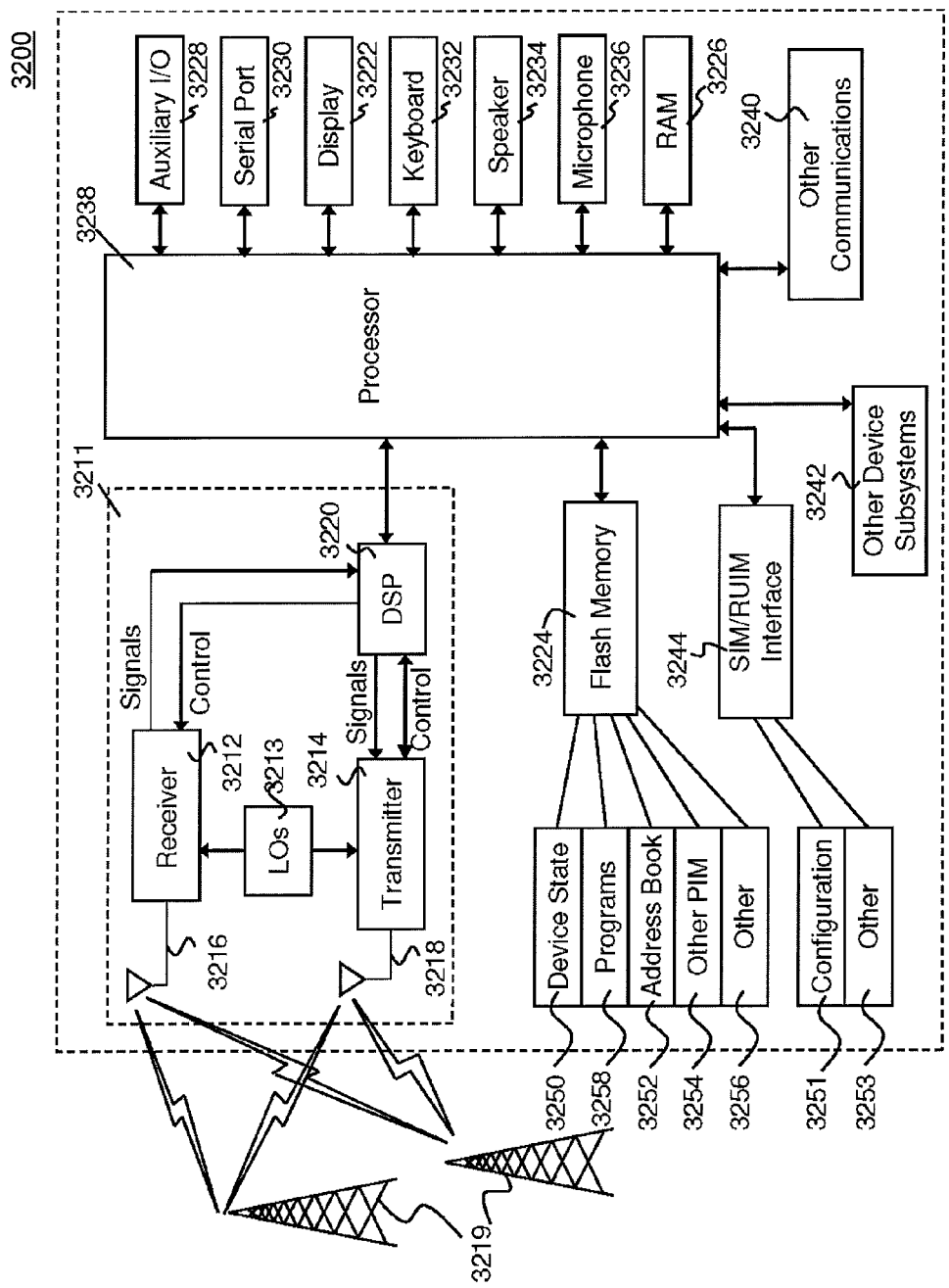
FIG. 9 is a block diagram with an example user equipment capable of being used with the systems and methods in the embodiments described herein.

When required network registration or activation procedures have been completed, UE 3200 may send and receive communication signals over the network 3219. As illustrated in FIG. 9, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal

| MAC-MainConfig field descriptions |
|---|
| <text omitted> |
| longDRX-CycleStartOffset |
| longDRX-Cycle and drxStartOffset in TS 36.321 [6]. The value of longDRX-Cycle is in number of sub-frames. Value sf10 corresponds to 10 sub-frames, sf20 corresponds to 20 sub-frames and so on. If shortDRX-Cycle is configured, the value of longDRX-Cycle shall be a multiple of the shortDRX-Cycle value. The value of drxStartOffset value is in number of sub-frames. When ABS subframes are used in a victim cell, longDRX-Cycle is set to $5*2^n$ where n is 3, 4 . . . 9 in FDD and 1, 2, . . . 9 for TDD. drxStartOffset should be adjusted so that some paging occasions are in an on duration period and in a restricted subframe. |

As described herein, in one embodiment the UE may be configured to check paging occasions based on subframes where the paging occasion would be aligned with the restricted subframe pattern. In another embodiment, the network may utilize the DRX configuration such that the on-duration of DRX and the restricted subframe pattern are aligned with paging occasions.

The concepts described above may be implemented by a network element. A simplified network element is shown allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control.

For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 could include a USB port or other port known to those in the art.

Some of the subsystems shown in FIG. 9 perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 in FIG. 9 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMax.

Figure 10:
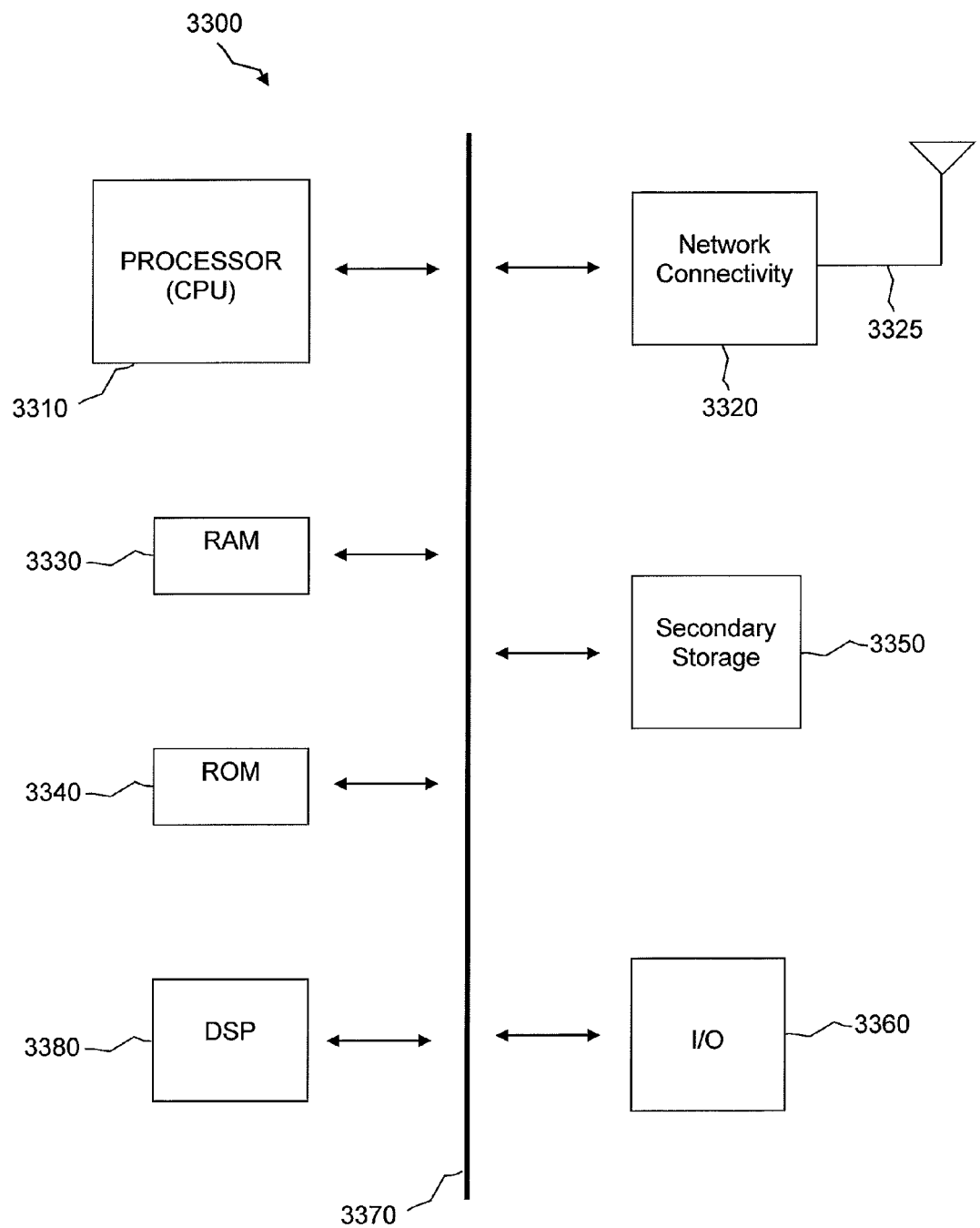
FIG. 10 illustrates a processor and related components suitable for implementing the several embodiments of the present disclosure.

The UE and other components described above might include a processing component that is capable of executing instructions related to the actions described above. FIG. 10 illustrates an example of a system 3300 that includes a processing component 3310 suitable for implementing one or more embodiments disclosed herein. The processing component 3310 may be substantially similar to the processor 3120 of FIG. 8 and/or the processor 3238 of FIG. 9.

In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMax) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

The following are incorporated herein by reference for all purposes: 3GPP TS 36.213 version 10.3.0, 3GPP TS 36.300 version 10.5.0, 3GPP TS 36.304 version 10.3.0, 3GPP TS 36.321 version 10.3.0, and 3GPP TS 36.331 version 10.3.0.

In an embodiment, a method for operating a UE in a wireless communications network is provided. The method comprises attempting, by a UE configured to operate in a DRX mode and with time domain measurement resource restrictions, to read a paging message in a paging occasion in a restricted subframe during DRX active time.

In another embodiment, a UE is provided. The UE comprises a processor configured such that the UE attempts to read a paging message in a paging occasion in a restricted subframe during DRX active time. The UE is configured to operate in DRX mode and with time domain measurement resource restrictions.

In another embodiment, a method for operating a network element in a wireless communications network is provided. The method comprises configuring, by the network element, a DRX cycle to $5*2^n$ subframes and a DRX start offset that aligns on-duration periods to paging occasions that are protected by restricted subframes. The network element is configured to utilize DRX and time domain measurement resource restrictions.

In another embodiment, a network element in a wireless communications network is provided. The network element comprises a processor configured such that the network element configures a DRX cycle to $5*2^n$ subframes and a DRX start offset that aligns on-duration periods to paging occasions that are protected by restricted subframes. The network element is configured to utilize DRX and time domain measurement resource restrictions.

In another embodiment, a method for operating a UE in a wireless heterogeneous network is provided. The method comprises attempting, by the UE, to read a paging radio network temporary identifier in selected subframes at a selected time interval. The method further comprises activating, by the UE, its receiver to receive transmissions from at least one of an underlay cell and an overlay cell during an active time. The subframes are selected by the network to promote intercell interference coordination via a coordination method, the coordination method being one of a backhaul signaling technique or an almost blank subframe technique.

The present disclosure provides illustrative implementations of one or more embodiments. The disclosure should in no way be limited to the illustrative implementations, drawings, and techniques illustrated below, including the exemplary designs and implementations illustrated and described herein, but may be modified within the scope of the appended claims along with their full scope of equivalents. A person of skill in the relevant art will recognized that the disclosed systems and/or methods may be implemented using any number of techniques, whether currently known or in existence. Embodiments are described herein in the context of an LTE wireless network or system, but can be adapted for other wireless networks or systems.

This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

---

Text Box 1

MeasSubframePattern
The IE MeasSubframePattern is used to specify time domain measurement resource restriction. The first/leftmost bit corresponds to the subframe #0 of the radio frame satisfying SFN mod x = 0, where SFN is that of PCell and x is the size of the bit string divided by 10. "1" denotes that the corresponding subframe is used for measurement.
MeasSubframePattern information element
-- ASN1START
```
MeasSubframePattern-r10 ::= CHOICE {
    subframePatternFDD-r10          BIT STRING (SIZE (40)),
    subframePatternTDD-r10          CHOICE {
        subframeConfig1-5-r10           BIT STRING
                                        (SIZE (20)),
        subframeConfig0-r10             BIT STRING
                                        (SIZE (70)),
        subframeConfig6-r10             BIT STRING
                                        (SIZE (60)),
        ...
    },
    ...
}
```

---

Text Box 2

Figure 4:
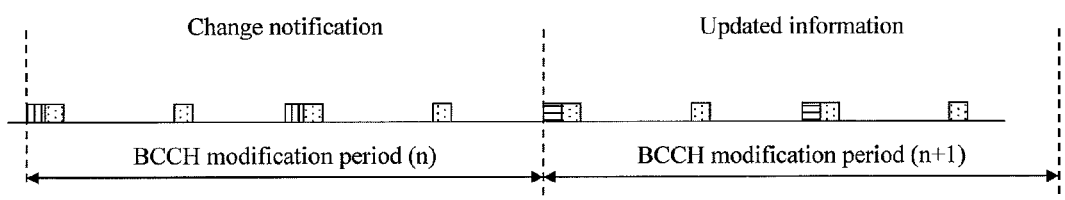
FIG. 4 is a diagram of notification of changes in system information.

5.2.1.3 System information validity and notification of changes
Change of system information (other than for ETWS and CMAS) only occurs at specific radio frames, i.e. the concept of a modification period is used. System information may be transmitted a number of times with the same content within a modification period, as defined by its scheduling. The modification period boundaries are defined by SFN values for which SFN mod m = 0, where m is the number of radio frames comprising the modification period. The modification period is configured by system information.
When the network changes (some of the) system information, it first notifies the UEs about this change, i.e. this may be done throughout a modification period. In the next modification period, the network transmits the updated system information. These general principles are illustrated in FIG. 4, in which different types of shading indicate different system information. Upon receiving a change notification, the UE acquires the new system information immediately from the start of the next modification period. The UE applies the previously acquired system information until the UE acquires the new system information.
The Paging message is used to inform UEs in RRC_IDLE and UEs in RRC_CONNECTED about a system information change. If the UE receives a Paging message including the systemInfoModification, it knows that the system information will change at the next modification period boundary. Although the UE may be informed about changes in system information, no further details are provided e.g. regarding which system information will change.
SystemInformationBlockType1 includes a value tag, systemInfoValueTag, that indicates if a change has occurred in the SI messages. UEs may use systemInfoValueTag, e.g. upon return from out of coverage, to verify if the previously stored SI messages are still valid. Additionally, the UE considers stored system information to be invalid after 3 hours from the moment it was successfully confirmed as valid, unless specified otherwise.
E-UTRAN may not update systemInfoValueTag upon change of some system information e.g. ETWS information, CMAS information, regularly changing parameters like CDMA2000 system time (see 6.3). Similarly, E-UTRAN may not include the systemInfoModification within the Paging message upon change of some system information.
The UE verifies that stored system information remains valid by either checking systemInfoValueTag in SystemInformationBlockType1 after the modification period boundary, or attempting to find the systemInfoModification indication at least modificationPeriodCoeff times during the modification period in case no paging is received, in every modification period. If no paging message is received by the UE during a modification period, the UE may assume that no change of system information will occur at the next modification period boundary. If UE in RRC_CONNECTED, during a modification period, receives one paging message, it may deduce from the presence/absence of systemInfoModification whether a change of system information other than ETWS and CMAS information will occur in the next modification period or not.
ETWS and/or CMAS capable UEs in RRC_CONNECTED shall attempt to read paging at least once every defaultPagingCycle to check whether ETWS and/or CMAS notification is present or not.
5.2.1.4 Indication of ETWS notification
ETWS primary notification and/or ETWS secondary notification can occur at any point in time. The Paging message is used to inform ETWS capable UEs in RRC_IDLE and UEs in RRC_CONNECTED about presence of an ETWS primary notification and/or ETWS secondary notification. If the UE receives a Paging message including the etws-Indication, it shall start receiving the ETWS primary notification and/ or ETWS secondary notification according to schedulingInfoList contained in SystemInformationBlockType1.
<Text omitted>
5.2.1.5 Indication of CMAS notification
CMAS notification can occur at any point in time. The Paging message is used to inform CMAS capable UEs in RRC_IDLE and UEs in RRC_CONNECTED about presence of one or more CMAS notifications. If the UE receives a Paging message including the cmas-Indication, it shall start receiving the CMAS notifications according to schedulingInfoList contained in SystemInformationBlockType1.
<Text omitted>

Text Box 3

7 PAGING
7.1 Discontinuous Reception for paging
The UE may use Discontinuous Reception (DRX) in idle mode in order to reduce power consumption. One Paging Occasion (PO) is a subframe where there may be P-RNTI transmitted on PDCCH addressing the paging message. One Paging Frame (PF) is one Radio Frame, which may contain one or multiple Paging Occasion(s). When DRX is used the UE needs only to monitor one PO per DRX cycle.
PF and PO is determined by following formulae using the DRX parameters provided in System Information:
PF is given by following equation:
SFN mod T = (T div N)*(UE_ID mod N)
Index i_s pointing to PO from subframe pattern defined in 7.2 will be derived from following calculation:
i_s = floor(UE_ID/N) mod Ns
System Information DRX parameters stored in the UE shall be updated locally in the UE whenever the DRX parameter values are changed in SI. If the UE has no IMSI, for instance when making an emergency call without USIM, the UE shall use as default identity UE_ID = 0 in the PF and i_s formulas above.
The following Parameters are used for the calculation of the PF and i_s:
T: DRX cycle of the UE. T is determined by the shortest of the UE specific DRX value, if allocated by upper layers, and a default DRX value broadcast in system information. If UE specific DRX is not configured by upper layers, the default value is applied.
nB: 4T, 2T, T, T/2, T/4, T/8, T/16, T/32.
N: min(T, nB)
Ns: max(1, nB/T)
UE_ID: IMSI mod 1024.
IMSI is given as sequence of digits of type Integer (0 . . . 9), IMSI shall in the formulae above be interpreted as a decimal integer number, where the first digit given in the sequence represents the highest order digit.
For example:
IMSI = 12 (digit1 = 1, digit2 = 2)
In the calculations, this shall be interpreted as the decimal integer "12", not "1 × 16 + 2 = 18".

7.2 Subframe Patterns

| Ns | PO when i_s = 0 | PO when i_s = 1 | PO when i_s = 2 | PO when i_s = 3 |
|---|---|---|---|---|
| FDD: | | | | |
| 1 | 9 | N/A | N/A | N/A |
| 2 | 4 | 9 | N/A | N/A |
| 4 | 0 | 4 | 5 | 9 |
| TDD (all UL/DL configurations): | | | | |
| 1 | 0 | N/A | N/A | N/A |
| 2 | 0 | 5 | N/A | N/A |
| 4 | 0 | 1 | 5 | 6 |

Text Box 4

RadioResourceConfigCommon
The IE RadioResourceConfigCommonSIB and IE RadioResourceConfigCommon are used to
specify common radio resource configurations in the system information and in the
mobility control information, respectively, e.g., the random access parameters
and the static physical layer parameters.
RadioResourceConfigCommon information element
-- ASN1START
```
RadioResourceConfigCommonSIB ::=    SEQUENCE {
    rach-ConfigCommon               RACH-ConfigCommon,
    bcch-Config                     BCCH-Config,
    pcch-Config                     PCCH-Config,
    prach-Config                    PRACH-ConfigSIB,
    pdsch-ConfigCommon              PDSCH-ConfigCommon,
    pusch-ConfigCommon              PUSCH-ConfigCommon,
    pucch-ConfigCommon              PUCCH-ConfigCommon,
    soundingRS-UL-ConfigCommon      SoundingRS-UL-ConfigCommon,
    uplinkPowerControlCommon        UplinkPowerControlCommon,
    ul-CyclicPrefixLength           UL-CyclicPrefixLength,
    ...,
    [[ uplinkPowerControlCommon-v1020   UplinkPowerControlCommon-v1020           OPTIONAL      -- Need
OR
    ]]
}
<text omited>
BCCH-Config ::=                     SEQUENCE {
    modificationPeriodCoeff         ENUMERATED {n2, n4, n8, n16}
}
```

Text Box 4

```
PCCH-Config ::=            SEQUENCE {
    defaultPagingCycle         ENUMERATED {
                                   rf32, rf64, rf128, rf256},
    nB                         ENUMERATED {
                                   fourT, twoT, oneT, halfT, quarterT, oneEighthT,
                                   oneSixteenthT, oneThirtySecondT}
}
``` defaultPagingCycle
Default paging cycle, used to derive 'T' in TS 36.304. Value rf32 corresponds to 32 radio frames,
rf64 corresponds to 64 radio frames and so on.
modificationPeriodCoeff
Actual modification period, expressed in number of radio frames= modificationPeriodCoeff*
defaultPagingCycle. n2 corresponds to value 2, n4 corresponds to value 4, n8 corresponds to
value 8 and n16 corresponds to value 16.
nB
Parameter: nB is used as one of parameters to derive the Paging Frame and Paging Occasion
according to TS 36.304. Value in multiples of 'T' as defined in TS 36.304 [4]. A value of
fourT corresponds to 4 * T, a value of twoT corresponds to 2 * T and so on.

Text Box 5

5.5 PCH reception
When the UE needs to receive PCH, the UE shall:
if a PCH assignment has been received on the PDCCH of the PCell for the P-RNTI:
attempt to decode the TB on the PCH as indicated by the PDCCH information.
if a TB on the PCH has been successfully decoded:
deliver the decoded MAC PDU to upper layers.
<text_omited>
5.7 Discontinuous Reception (DRX)
The UE may be configured by RRC with a DRX functionality that controls the UE's PDCCH monitoring activity
for the UE's C-RNTI, TPC-PUCCH-RNTI, TPC-PUSCH-RNTI and Semi-Persistent Scheduling C-RNTI (if
configured). When in RRC_CONNECTED, if DRX is configured, the UE is allowed to monitor the PDCCH
discontinuously using the DRX operation specified in this subclause; otherwise the UE monitors the PDCCH
continuously. When using DRX operation, the UE shall also monitor PDCCH according to requirements found in
other subclauses of this specification. RRC controls DRX operation by configuring the timers onDurationTimer,
drx-InactivityTimer, drx-RetransmissionTimer (one per DL HARQ process except for the broadcast process), the
longDRX-Cycle, the value of the drxStartOffset and optionally the drxShortCycleTimer and shortDRX-Cycle. A
HARQ RTT timer per DL HARQ process (except for the broadcast process) is also defined (see subclause 7.7).
When a DRX cycle is configured, the Active Time includes the time while:
onDurationTimer or drx-InactivityTimer or drx-RetransmissionTimer or mac-ContentionResolutionTimer
(as described in subclause 5.1.5) is running; or
a Scheduling Request is sent on PUCCH and is pending (as described in subclause 5.4.4); or
an uplink grant for a pending HARQ retransmission can occur and there is data in the corresponding
HARQ buffer; or
a PDCCH indicating a new transmission addressed to the C-RNTI of the UE has not been received after
successful reception of a Random Access Response for the preamble not selected by the UE (as
described in subclause 5.1.4).
When DRX is configured, the UE shall for each subframe:
if a HARQ RTT Timer expires in this subframe and the data in the soft buffer of the corresponding
HARQ process was not successfully decoded:
start the drx-RetransmissionTimer for the corresponding HARQ process.
if a DRX Command MAC control element is received:
stop onDurationTimer;
stop drx-InactivityTimer.
if drx-InactivityTimer expires or a DRX Command MAC control element is received in this subframe:
if the Short DRX cycle is configured:
start or restart drxShortCycleTimer;
use the Short DRX Cycle.
else:
use the Long DRX cycle.
if drxShortCycleTimer expires in this subframe:
use the Long DRX cycle.
If the Short DRX Cycle is used and [(SFN * 10) + subframe number] modulo (shortDRX-Cycle) =
(drxStartOffset) modulo (short DRX- Cycle); or
if the Long DRX Cycle is used and [(SFN * 10) + subframe number] modulo (longDRX-Cycle) =
drxStartOffset:
start onDurationTimer.
during the Active Time, for a PDCCH-subframe, if the subframe is not required for uplink transmission
for half-duplex FDD UE operation and if the subframe is not part of a configured measurement gap:
monitor the PDCCH;
if the PDCCH indicates a DL transmission or if a DL assignment has been configured for this
subframe:
start the HARQ RTT Timer for the corresponding HARQ process;

Text Box 5 stop the drx-RetransmissionTimer for the corresponding HARQ process.
if the PDCCH indicates a new transmission (DL or UL):
start or restart drx-InactivityTimer.
when not in Active Time, type-0-triggered SRS [2] shall not be reported.
if CQI masking (cqi-Mask) is setup by upper layers:
when onDurationTimer is not running, CQI/PMI/RI/PTI on PUCCH shall not be reported.
else:
when not in Active Time, CQI/PMI/RI/PTI on PUCCH shall not be reported.
Regardless of whether the UE is monitoring PDCCH or not, the UE receives and transmits HARQ feedback and
transmits type-1-triggered SRS [2] when such is expected.
NOTE: A UE may optionally choose to not send CQI/PMI/RI/PTI reports on PUCCH and/or type-0-
triggered SRS transmissions for up to 4 subframes following a PDCCH indicating a new
transmission (UL or DL) received in the last subframe of active time. The choice not to send
CQI/PMI/RI/PTI reports on PUCCH and/or type-0-triggered SRS transmissions is not applicable
for subframes where onDurationTimer is running.
NOTE: The same active time applies to all activated serving cell(s).

What is claimed is:

1. A method for operating a user equipment (UE) in a wireless communications network, the method comprising:
attempting, by a UE configured to operate in a discontinuous reception (DRX) mode and with time domain measurement resource restrictions, to read a paging message in a paging occasion in a restricted sub frame during DRX active time; and
receiving, by the UE, a configuration, wherein the configuration includes a DRX interval set to $5*2^n$ frames and a DRX start offset that promotes the UE reading paging messages during the restricted sub frame within an on-duration and the UE not attempting to read paging messages in other sub frames and wherein n is a positive integer.

2. The method of claim 1, further comprising estimating, by the UE, available paging occasions based on paging control channel configurations, configured DRX parameters, and restricted sub frame patterns, wherein at least one of the paging control channel configurations, the configured DRX parameters, or the restricted sub frame patterns are configured such that the paging occasion coincides with a DRX on-duration period in which the UE monitors a physical downlink control channel (PDCCH).

3. The method of claim 1, further comprising:
estimating, by the UE, the probability of a target paging occasion being within the active time; and
determining, by the UE, which paging occasions to read based on the estimation in order to conserve battery power.

4. The method of claim 1, further comprising calculating, by the UE, the number of paging occasions to read by assuming that the probability of a target paging occasion being within the active time is proportional to current data activity.

5. The method of claim 1, wherein the wireless communications network is a heterogeneous network (HetNet) including a victim cell and an aggressor cell overlaying the victim cell, and wherein the restricted sub frame is scheduled to occur in the victim cell when an almost blank sub frame (ABS) is transmitted by an access node in the aggressor cell.

6. A user equipment (UE) comprising:
a memory device; and
a processor configured to execute computer readable instructions stored on the memory device such that when executed, the UE attempts to read a paging message in a paging occasion in a restricted sub frame during discontinuous reception (DRX) active time, wherein the UE is configured to operate in DRX mode and with time domain measurement resource restrictions,
the processor further configured such that the UE receives a configuration, wherein the configuration includes a DRX interval set to $5*2^n$ sub frames and a DRX start offset that promotes the UE reading paging messages during the restricted sub frame within an on-duration and the UE not seeking to read paging messages in other sub frames, and wherein n is a positive integer.

7. The UE of claim 6, wherein the UE estimates available paging occasions based on paging control channel configurations, configured DRX parameters, and restricted sub frame patterns, and wherein at least one of the paging control channel configurations, the configured DRX parameters, or the restricted sub frame patterns are configured such that the paging occasion coincides with a DRX on-duration period in which the UE monitors a physical downlink control channel (PDCCH).

8. The UE of claim 6, wherein the UE estimates the probability of a target paging occasion being within the active time, and wherein the UE determines which paging occasions to read based on the estimation in order to conserve battery power.

9. The UE of claim 6, wherein the UE calculates the number of paging occasions to read by assuming that the probability of a target paging occasion being within the active time is proportional to current data activity.

10. A method for operating a network element in a wireless communications network, the method comprising:
configuring, by the network element, a discontinuous reception (DRX) cycle to $5*2^n$ sub frames and a DRX start offset that aligns on-duration periods to paging occasions that are protected by restricted sub frames, wherein the network element is configured to utilize DRX and time domain measurement resource restrictions.

11. The method of claim 10, wherein the DRX start offset is set to $10*m+9$ (m=0, 1, ... floor$((5*2n-9)/10)$).

12. The method of claim 10, wherein the network element is a victim node in a heterogeneous network.

13. The method of claim 12, wherein the victim node is at least one of:
a pico cell;
a femto cell;
a relay; or
a macro cell.

14. A network element in a wireless communications network, the network element comprising:

a memory device; and a processor configured to execute computer readable instructions stored on the memory device such that when executed, the network element configures a discontinuous reception (DRX) cycle to $5*2^n$ sub frames and a DRX start offset that aligns on-duration periods to paging occasions that are protected by restricted sub frames, wherein the network element is configured to utilize DRX and time domain measurement resource restrictions.

15. The network element of claim 14, wherein the DRX start offset is set to $10*m+9$ (m=0, 1, ... floor$((5*2n-9)/10)$).

16. The network element of claim 14, wherein the network element is a victim node in a heterogeneous network.

17. The network element of claim 16, wherein the victim node is at least one of:

a pico cell;

a femto cell;

a relay; or a macro cell.

18. A method for operating a user equipment (UE) in a wireless heterogeneous network, the method comprising:

attempting, by the UE, to read a paging message in selected sub frames;

monitoring, by the UE, a physical downlink control channel (PDCCH) to receive transmissions from at least one of an underlay cell or an overlay cell during an active time, wherein the sub frames are selected by the network to promote intercell interference coordination via a coordination method, the coordination method being an almost blank sub frame (ABS) technique in which the selected sub frames are scheduled to align in time with almost blank sub frames transmitted by the network; and receiving, by the UE, a configuration, wherein the configuration includes a DRX interval set to $5*2^n$ sub frames and a start offset that promotes the UE reading paging messages during the selected sub frames within an on-duration and the UE not seeking to read paging messages in other sub frames, and wherein n is a positive integer.

19. The method of claim 18, wherein the selected time interval duration is one of a value allocated to the UE by the network or a broadcast value.

* * * * *

UNITED STATES PATENT AND TRADEMARK OFFICE
CERTIFICATE OF CORRECTION

PATENT NO. : 8,964,672 B2  
APPLICATION NO. : 13/545700  
DATED : February 24, 2015  
INVENTOR(S) : Takashi Suzuki et al.

Page 1 of 1

It is certified that error appears in the above-identified patent and that said Letters Patent is hereby corrected as shown below:

Claims

Column 21, Claim 1, Line 26 replace "sub frame" with -- subframe--; Line 31 replace "sub frame" with --subframe--; Line 33 replace "sub frames" with --subframes--; Claim 2, Line 41 replace "sub frame" with --subframe--; Claim 5, Lines 58 and 59 replace "sub frame" with --subframe--; Claim 6, Line 66 replace "sub frame" with --subframe--.

Column 22, Claim 6, Line 24 replace "sub frames" with --subframes--; Line 26 replace "sub frame" with --subframe--; Line 28 replace "sub frames" with --subframes--; Claim 7, Lines 31 and 34 replace "sub frame" with --subframe--; Claim 10, Lines 52 and 54 replace "sub frames" with --subframes--; Claim 11, Line 59, replace "2n" with --$2^n$--.

Column 23, Claim 14, Lines 7 and 9 replace "sub frames" with --subframes--; Claim 15, Line 14 replace "2n" with --$2^n$--.

Column 24, Claim 18, Lines 4 and 8 replace "sub frames" with --subframes--; Line 11 replace "sub frame" with --subframe--; Lines 12, 13, 15, 17, and 19 replace "sub frames" with --subframes--.

Signed and Sealed this  
First Day of December, 2015

Michelle K. Lee  
*Director of the United States Patent and Trademark Office*